(12) United States Patent
Edwards et al.

(10) Patent No.: US 9,835,481 B2
(45) Date of Patent: Dec. 5, 2017

(54) MULTICHANNEL CORRELATION ANALYSIS FOR DISPLACEMENT DEVICE

(71) Applicant: BAKER HUGHES INCORPORATED, Houston, TX (US)

(72) Inventors: Carl M. Edwards, Katy, TX (US);
Sebastian Csutak, Houston, TX (US);
Robert W. Adams, Houston, TX (US);
Kent Byerly, Seabrook, TX (US)

(73) Assignee: BAKER HUGHES, A GE COMPANY, LLC, Houton, TX (US)

( * ) Notice: Subject to any disclaimer, the term of this patent is extended or adjusted under 35 U.S.C. 154(b) by 696 days.

(21) Appl. No.: 14/318,006

(22) Filed: Jun. 27, 2014

(65) Prior Publication Data
US 2015/0377661 A1 Dec. 31, 2015

(51) Int. Cl.
*G01D 18/00* (2006.01)
*E21B 47/09* (2012.01)
*E21B 47/10* (2012.01)

(52) U.S. Cl.
CPC ........ *G01D 18/002* (2013.01); *E21B 47/09* (2013.01); *E21B 47/102* (2013.01)

(58) Field of Classification Search
CPC ...... G01D 18/002; E21B 47/102; E21B 47/09
See application file for complete search history.

(56) References Cited

U.S. PATENT DOCUMENTS

| | | | |
|---|---|---|---|
| 7,707,883 B2 | 5/2010 | DiFoggio | |
| 8,141,259 B2 | 3/2012 | Donadille et al. | |
| 8,543,350 B2 | 9/2013 | Hilby | |
| 8,594,937 B2 | 11/2013 | Mann et al. | |
| 2008/0034855 A1 | 2/2008 | Peeters et al. | |
| 2011/0185806 A1 | 8/2011 | Pfutzner | |
| 2011/0196636 A1 | 8/2011 | Edwards | |
| 2012/0271549 A1 | 10/2012 | Edwards et al. | |
| 2012/0271552 A1 | 10/2012 | Dashevsky et al. | |
| 2013/0191030 A1 | 7/2013 | Edwards et al. | |
| 2013/0283888 A1 | 10/2013 | DiFoggio | |

OTHER PUBLICATIONS

Shurubkin, V.D. et al., "Protection of a Ballistic Laser Gravimeter Against the Effects of Inertial Noise," Optico-Physical Measurements, Measurement Techniques, vol. 44, No. 1, pp. 49-54 (2001).

*Primary Examiner* — Mischita Henson
(74) *Attorney, Agent, or Firm* — Mossman, Kumer & Tyler, PC

(57) ABSTRACT

Methods, systems and devices for estimating a parameter of interest in a borehole. The apparatus may include a displacement device configured for displacement responsive to the parameter of interest and environmental noise; a detector array configured to provide information comprising a first signal and a second signal both relating to the displacement; and at least one processor configured to mitigate effects of the environmental noise on the information by determining correlated portions of each corresponding signal representative of effects of common mode elements of the environmental noise on each corresponding signal. The displacement device may be an optical displacement device configured to receive a first electromagnetic beam with a first value of a beam property and a second electromagnetic beam with a second value of the beam property, which comprises a displacement element configured for displacement responsive to the parameter of interest and the environmental noise.

17 Claims, 11 Drawing Sheets

MULTICHANNEL CORRELATION ANALYSIS FOR DISPLACEMENT DEVICE

BACKGROUND OF THE DISCLOSURE

1. Field of the Disclosure

In one aspect, this disclosure generally relates methods and apparatuses for measuring a parameter of interest by sensing displacement.

2. Background of the Art

Displacement sensors, such as microphones and pressure sensors, are well-known. Many displacement sensors may be based on one or more of electrical capacitance, electrical impedance, or magnetic fields. These electrical and magnetic based displacement sensors may be limited due to one or more of: low sensitivity, the need for high-voltage biasing, poor electrical isolation, environmental factors, and response nonlinearities. These limitations may require a close coupling between transducer design and the sensor mechanical design, which may limit performance and the operational size of the displacement sensor. Optical displacement sensors, such as displacement sensors using an etalon, may be electrically and magnetically insensitive, which may mitigate limitations found in electrical and magnetic based displacement sensors.

SUMMARY OF THE DISCLOSURE

In aspects, the present disclosure is related to an apparatus and method for estimating a parameter of interest using values of a beam property from at least one electromagnetic beam that pass through at least part of an optical displacement device.

One embodiment according to the present disclosure includes an apparatus for estimating a parameter of interest, comprising: a displacement device configured for displacement responsive to the parameter of interest and environmental noise; a detector array configured to provide information comprising a first signal and a second signal both relating to the displacement, wherein the first signal is at least as sensitive to the displacement as the second signal; and at least one processor configured to mitigate effects of the environmental noise on the information by determining correlated portions of each corresponding signal representative of effects of common mode elements of the environmental noise on each corresponding signal. The first signal may be more sensitive to the displacement than the second signal.

The displacement device may be an optical displacement device. The optical displacement device may be configured to receive a first electromagnetic beam with a first value of a beam property and a second electromagnetic beam with a second value of the beam property, wherein the first value is different than the second value. The optical displacement device may comprise a displacement element configured for displacement responsive to the parameter of interest and the environmental noise. The information may be in the form of a first signal relating to the displacement responsive to a received part of the first electromagnetic beam and a second signal relating to the displacement responsive to a received part of the second electromagnetic beam, wherein the received part of the first electromagnetic beam and the received part of the second electromagnetic beam both pass through at least part of the optical displacement device.

The at least one processor may be configured to: use the correlated portions of each corresponding signal to estimate a corresponding noise signal for the second signal, the corresponding noise signal representing a portion of the second signal attributable to the environmental noise; and modify the first signal using the corresponding noise signal for the second signal to attenuate the effects of the environmental noise on the first signal. The at least one processor may be configured to subtract the noise signal of the second signal from the first signal. The at least one processor may be configured to select the first signal from a plurality of signals each responsive to a received part of a corresponding electromagnetic beam having passed through at least part of the optical displacement device, the selection comprising identifying the first signal as the most sensitive of the plurality of signals to displacement. The at least one processor may be configured to select the second signal from a plurality of signals each responsive to a received part of a corresponding electromagnetic beam having passed through at least part of the optical displacement device, the selection comprising identifying the second signal as the most correlated of the plurality of signals to the first signal.

The at least one processor may be configured to remove the mean of the first signal from the first signal to derive a cyclical response; determine the corresponding noise signal by removing the mean of the second signal from the second signal; normalize the corresponding noise signal to the cyclical response of the first signal, such that the linear components are of the same magnitude; and perform a point-by-point subtraction of the corresponding noise signal from the cyclical response. Each corresponding noise signal may have a higher frequency than the remainder of the signal to which it corresponds. The at least one processor may be configured to select the second signal and at least one other signal from a plurality of signals each responsive to a received part of a corresponding electromagnetic beam having passed through at least part of the optical displacement device, the selection comprising identifying the second signal and the at least one other signal as the most correlated of the plurality of signals to the first signal; estimate a corresponding noise signal for each of the second signal and the at least one other signal; and determine a corresponding common mode suppressed signal for each of the second signal and the at least one other signal by modifying the first signal using the corresponding noise signal for each of the second signal and the at least one other signal; and combine the corresponding common mode suppressed signals. The at least one processor may be configured to use singular value decomposition to estimate a common mode output across the first signal, the second signal, and at least one other signal responsive to a received part of a corresponding electromagnetic beam having passed through at least part of the optical displacement device. A mode of the largest singular value may be assumed to be composed of the gravitational acceleration and a distortion component and the remaining modes are assumed to be the result of channel distortion and uncorrelated noise.

Another embodiment according to the present disclosure includes a method for estimating a parameter of interest in an earth formation intersected by a borehole. The method may include a method for estimating a parameter of interest. The method may include estimating the parameter of interest using a detector array configured to provide information comprising a first signal and a second signal both relating to displacement of a displacement device, the displacement device configured for displacement responsive to the parameter of interest and environmental noise, wherein the first signal is at least as sensitive to the displacement as the second signal, the estimation comprising mitigating effects of the environmental noise on the information by determining correlated portions of the first signal and the second signal representative of effects of the environmental noise on the corresponding signal. The first signal may be more sensitive to the displacement than the second signal.

The displacement device may be an optical displacement device. The optical displacement device may be configured to receive a first electromagnetic beam with a first value of a beam property and a second electromagnetic beam with a second value of the beam property, wherein the first value is different than the second value, the optical displacement device comprising a displacement element configured for displacement responsive to the parameter of interest and the environmental noise. The information may be a first signal relating to the displacement responsive to a received part of the first electromagnetic beam and a second signal relating to the displacement responsive to a received part of the second electromagnetic beam, wherein the received part of the first electromagnetic beam and the received part of the second electromagnetic beam both pass through at least part of the optical displacement device.

The method may include using the correlated portions of each corresponding signal to estimate a corresponding noise signal for the second signal, the corresponding noise signal representing a portion of the second signal attributable to the environmental noise; and modifying the first signal using the corresponding noise signal for the second signal to attenuate the effects of the environmental noise on the first signal. The method may include selecting the first signal from a plurality of signals each responsive to a received part of a corresponding electromagnetic beam having passed through at least part of the optical displacement device, the selection comprising identifying the first signal as the most sensitive of the plurality of signals to displacement. The method may include selecting the second signal from a plurality of signals each responsive to a received part of a corresponding electromagnetic beam having passed through at least part of the optical displacement device, the selection comprising identifying the second signal as the most correlated of the plurality of signals to the first signal. The method may include selecting the second signal and at least one other signal from a plurality of signals each responsive to a received part of a corresponding electromagnetic beam having passed through at least part of the optical displacement device, the selection comprising identifying the second signal and the at least one other signal as the most correlated of the plurality of signals to the first signal; estimating a corresponding noise signal for each of the second signal and the at least one other signal; and determining a corresponding common mode suppressed signal for each of the second signal and the at least one other signal by modifying the first signal using the corresponding noise signal for each of the second signal and the at least one other signal; and combining the corresponding common mode suppressed signals. The method may include using singular value decomposition to estimate a common mode output across the first signal, the second signal, and at least one other signal responsive to a received part of a corresponding electromagnetic beam having passed through at least part of the optical displacement device.

Embodiments may include a non-transitory computer-readable medium product for estimating a parameter of interest. The non-transitory computer-readable medium product may have instructions thereon that, when executed, cause at least one processor to perform one of the methods described above. The non-transitory computer-readable medium product may be configured for execution on the at least one processor of the above apparatus. The non-transitory computer-readable medium product may further comprise at least one of: (i) a ROM, (ii) an EPROM, (iii) an EEPROM, (iv) a flash memory, or (v) an optical disk.

Example features of the disclosure have been summarized rather broadly in order that the detailed description thereof that follows may be better understood and in order that the contributions they represent to the art may be appreciated. There are, of course, additional features of the disclosure that will be described hereinafter and which will form the subject of the claims appended hereto.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION OF THE DISCLOSURE

Figure 1:
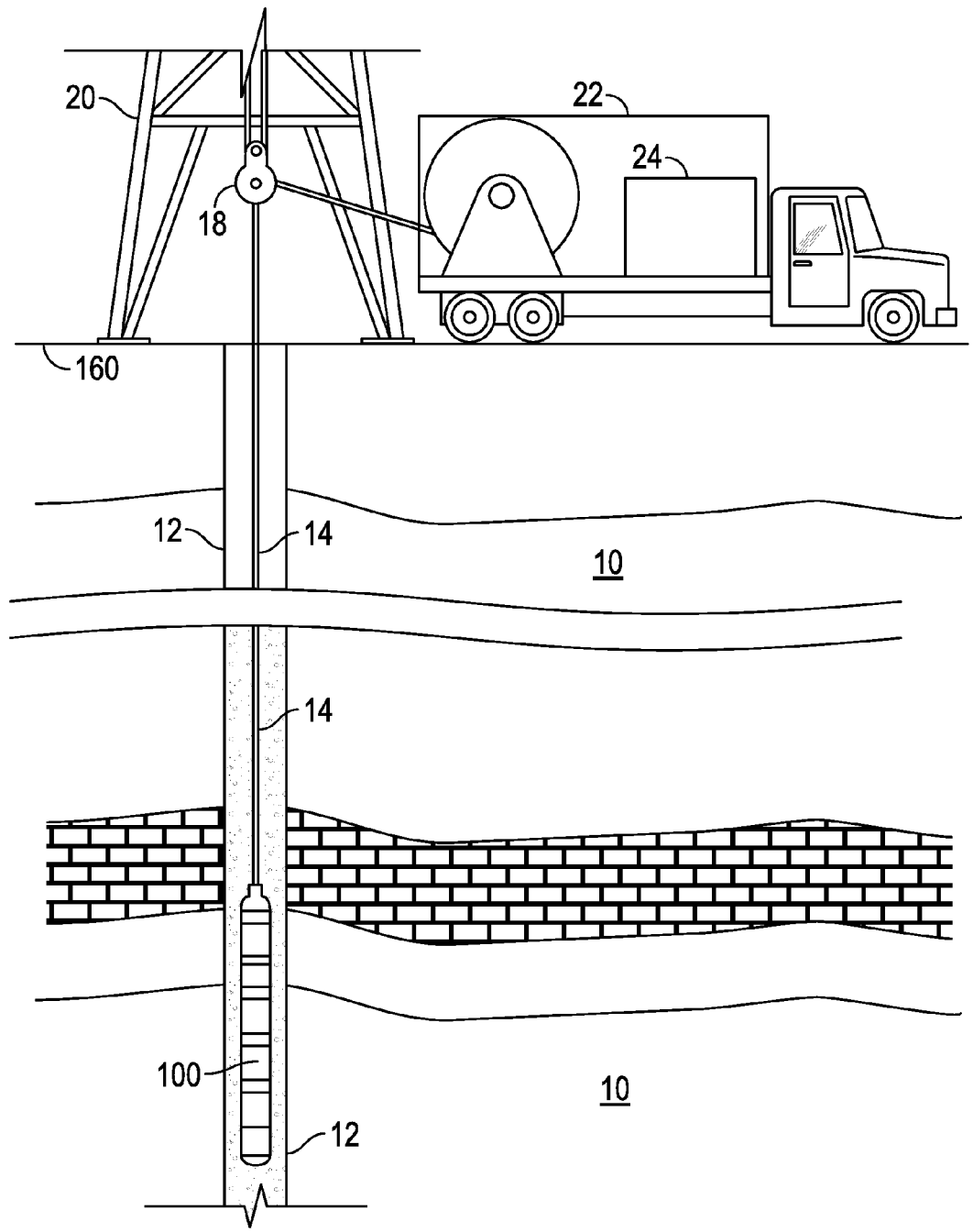
FIG. 1 shows an optical displacement device deployed along a wireline in accordance with embodiments of the present disclosure.

The present disclosure relates to systems, devices and methods for estimating a parameter of interest with a displacement device using techniques for mitigating effects of common mode noise on measurements relating to the parameter. These methods may be tailored for real-time operation. The displacement device may have multiple channels of information relating to the displacement. Some environmental sources of noise synchronously stimulate sensor response across multiple channels. Noise from these sources may be mitigated by determining correlated portions of each corresponding channel representative of effects of common mode elements of the environmental noise. Techniques may include using pseudo-differential analysis or singular value decomposition.

Aspects of the present disclosure include a displacement device, such as an optical displacement device, including a displacement member configured for displacement responsive to the parameter of interest. The displacement is also responsive to environmental noise. A detector array may be configured to provide information comprising a first signal and a second signal both relating to the displacement (e.g., measuring the same displacement), wherein the first signal is more sensitive to the displacement than the second signal.

For example, in multi-beam gravimeters (one type of optical displacement device), a gravimeter may produce multiple channels of measurement information related to displacement of a displacement member responsive to a parameter of interest. The device may be configured to receive a first electromagnetic beam with a first value of a beam property and a second electromagnetic beam with a second value of the beam property, wherein the first value is different than the second value. The beam property may be, for example, angle of incidence, wavelength, and so on. For this device, the information from the associated detector may comprise a first signal relating to the displacement responsive to a received part of the first electromagnetic beam and a second signal relating to the displacement responsive to a received part of the second electromagnetic beam, wherein the received part of the first electromagnetic beam and the received part of the second electromagnetic beam both pass through at least part of the optical displacement device. Thus, each channel of information is responsive to a particular beam, and each channel may have a different sensitivity for a given interval of displacement.

Some pervasive types of environmental noise cause a response synchronous on all channels. By determining correlated portions of each corresponding signal representative of effects of common mode elements of the environmental noise, measurements from at least one of the channels may be altered, such that effects of environmental noise are mitigated.

The present disclosure is susceptible to embodiments of different forms. There are shown in the drawings, and herein will be described in detail, specific embodiments of the present disclosure with the understanding that the present disclosure is to be considered an exemplification of the principles of the present disclosure and is not intended to limit the present disclosure to that illustrated and described herein.

FIG. 1 shows one embodiment according to the present disclosure wherein a cross-section of a subterranean formation 10 in which is drilled a borehole 12 is schematically represented. Suspended within the borehole 12 at the bottom end of a carrier such as a wireline 14 is a device or tool 100. The tool 100 may include processor. The wireline 14 may be carried over a pulley 18 supported by a derrick 20. Wireline deployment and retrieval is performed by a powered winch carried by a service truck 22, for example. A control panel 24 interconnected to the tool 100 through the wireline 14 by conventional means controls transmission of electrical power, data/command signals, and also provides control over operation of the components in the device 100. Use of a non-rigid carrier to convey tool 100 is exemplary only. Tool 100 may also be conveyed by a rigid carrier, such as, for example, a drillpipe. In some embodiments, the borehole 12 may be utilized to recover hydrocarbons. In other embodiments, the borehole 12 may be used for geothermal applications, water production, mining, tunnel construction, or other uses.

In embodiments, the device 100 may be configured to collect information regarding force or acceleration. The device may also be configured to: (i) actively or passively collect information about the various characteristics of the formation, (ii) provide information about tool orientation and direction of movement, (iii) provide information about the characteristics of the reservoir fluid and/or (iv) evaluate reservoir conditions (e.g., formation pressure, wellbore pressure, temperature, etc.). Exemplary devices may include resistivity sensors (for determining the formation resistivity, dielectric constant and the presence or absence of hydrocarbons), acoustic sensors (for determining the acoustic porosity of the formation and the bed boundary in the formation), nuclear sensors (for determining the formation density, nuclear porosity and certain rock characteristics), nuclear magnetic resonance sensors (for determining the porosity and other petrophysical characteristics of the formation), and gravimeters/gravity gradiometers (for estimating formation density). Other exemplary devices may include gyroscopes, magnetometers, accelerometers, and sensors that collect formation fluid samples and determine the properties of the formation fluid, which include physical properties and chemical properties.

Device 100 may be conveyed to a position in operable communication or proximity with a parameter of interest. In some embodiments, device 100 maybe conveyed into a borehole 12. The parameter of interest may include, but is not limited to, one of: (i) pressure, (ii) force, and (iii) acceleration. Depending on the operating principle of the device 100, the device 100 may be configured to operate under surface and borehole conditions. The ambient temperature in the borehole may exceed 120 degrees Celsius (248 degrees Fahrenheit). In other embodiments, a device 100 may be used at the surface 160.

Device 100 includes an optical displacement sensor in accordance with embodiments of the present disclosure. Optical-displacement sensors operate by detecting light reflected by an optical element that changes its reflectivity as a result of displacement (e.g., change in position over time) of a member in response to an environmental stimulus, such as pressure differential, sound, vibration, change in gravity, etc. The detected light may be converted into an electrical signal. This signal may be a function of the reflectivity of the optical element, and, therefore, a function of the stimulus as well. The optical displacement sensor may include an optical interferometer.

Optical interferometers have been proven to have outstanding resolution when used as displacement detectors in physical sensing components, such as microphones, pressure sensors, and accelerometers. One exemplary optical interferometer is the Fabry-Perot interferometer, which is also known as an etalon. An etalon may include an optically resonant cavity that distributes optical energy of an input light signal into a reflected signal and a transmitted signal. The ratio of optical energy in the reflected and transmitted signals may depend on the cavity length of the optically resonant cavity, which is the spacing between its two, substantially-parallel, partially reflective surfaces and its operating wavelength, i.e., the wavelength of the light on which the interferometer operates.

In an etalon, light can be strongly modulated by very small changes in the cavity length, and these changes can be detected using standard optical detection approaches that result in high sensitivity. The use of light beam for the readout is very different from the more standard approaches that use charged particles, including electrostatic, capacitive, piezoelectric, or piezoresistive techniques. All of these technologies require a close coupling between the transducer design and the sensor mechanical design. This results in constraints on the sensor that affect the performance adversely, especially as the size is reduced. An etalon-based displacement sensor having high dynamic range and high sensitivity may have many advantages in the field of physical sensing including reduction in size of the optical interferometer transducer and not adversely interacting with the optical interference transducer. This independence between the etalon and the optical interference transducer may result in the benefit of a decoupling of the transducer and the sensor design.

An etalon may be configured to be sensitive to a force or acceleration stimulus by having one surface of the etalon operably connected to a surface of, or disposed on, a movable element. When the element moves in response to the stimulus, the cavity length changes and, therefore, so does the ratio of optical energy in the reflected and transmitted signals. As a result, an electrical output signal based on one of the reflected and transmitted signals may be a function of the stimulus incident on the etalon.

The basic operating principal involves the creation of an optical path whose length is varied when subjected to an external stimulus, such as pressure or acceleration. An etalon may be used for consideration of the design issues in these types of transducers in general. This type of interferometer may have two parallel dielectric mirrors that bound an empty cavity. Light that is incident upon the cavity will be partially transmitted according to the formula:

$$T = \frac{1}{(1 + F \sin^2 \varphi/2)^2}, \quad (1)$$

wherein F (finesse) is determined by the reflectance of the two mirrors, $$F = \frac{4R_0}{(1 - R_0)^2}, \quad (2)$$

wherein $R_0$ is the reflectance of the mirrors. Herein, it is assumed that the reflectance values of the two mirrors are equal. $\varphi = 4\pi n d \cos \theta / \lambda$ is the phase that is picked up in a wave with wavelength $\lambda$ as it makes a roundtrip within the cavity of length d and index of refraction n with angle of incidence $\theta$.

Figure 2:
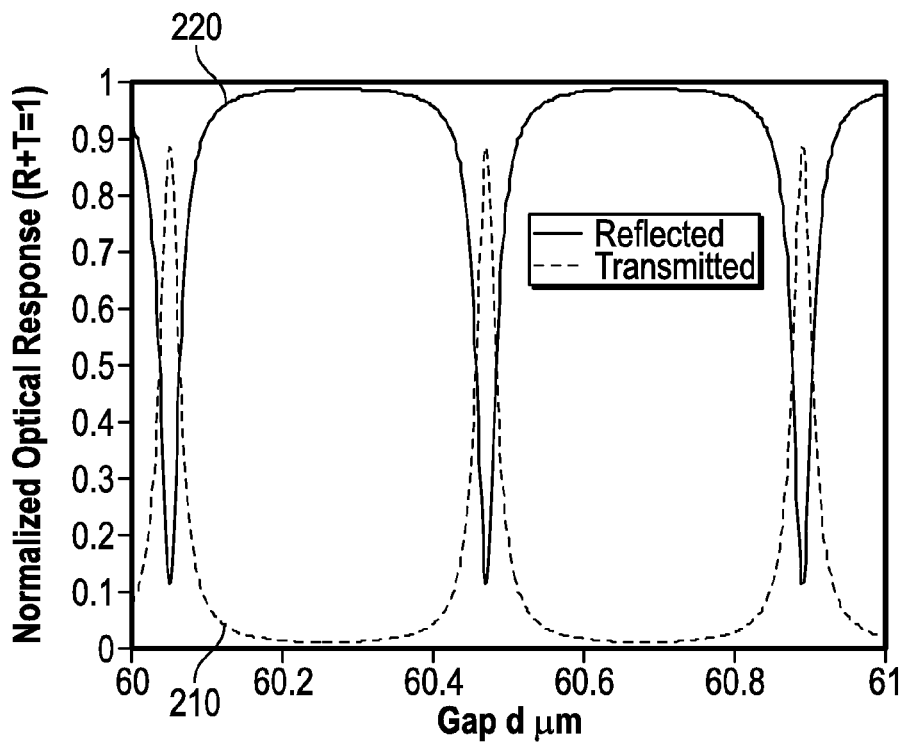
FIG. 2 shows a graph of reflected and transmitted light in a Fabry-Perot interferometer in accordance with embodiments of the present disclosure.

A typical response is shown in FIG. 2, where a transmitted wave 210 is reflected as reflected wave 220. The rate of change of the optical signal may be on the order of several percent per nanometer of motion. The optical signal can be resolved at a level below 100 parts per billion (ppb), which translates to the ability of the transducer to detect femtometer-scale changes in the displacement of one mirror relative to the other mirror. However, the sensitivity of the transducer may be very low throughout most of the typical operating points as can be seen in curves 210 and 220. Sensitivity of the transducer may be proportional to the absolute value of the slope of curves 210 and 220. So it may be observed that the slope, and sensitivity, may be very low when the gap d is between about 60.2 micrometers and 60.4 micrometers, and the slope may observed to be higher between about 60.4 micrometers and 60.6 micrometers.

A high resolution sensor may require that the optical cavity length be allowed to vary over many wavelengths. One way to maintain sensitivity over a wide range of cavity lengths is to use multiple beams of light where each beam has a different response to changes in cavity length. The multiple beams of light may exhibit different responses by having different wavelengths, different angles of incidence, or a combination thereof.

Figure 3:
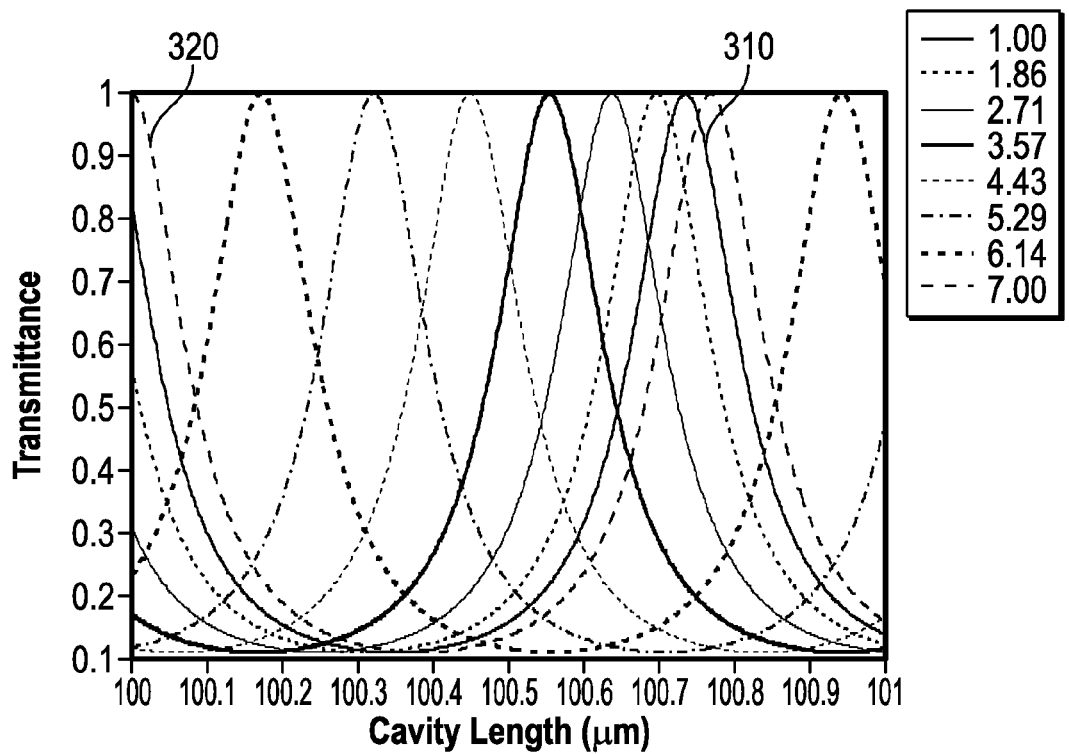
FIG. 3 shows a graph of optical responses to a range of incident angles of light in the Fabry-Perot interferometer in accordance with embodiments of the present disclosure.

FIG. 3 shows a chart of curves representing multiple beams on light using an exemplary set of different angles of incidence. The angles of incidence in this example range from 1.00 degrees in curve 310 to 7.00 degrees in curve 320. This range of angles is exemplary and illustrative only, and other ranges of angles may be used as would be understood by one of skill in the art with the benefit of the present disclosure. It may be seen from these curves that more than one beam may be sensitive to a particular cavity length. These beams may be produced using techniques known to those of skill in the art, including, but not limited to, one or more of: (i) directing multiple light beams toward a single lens configured to operate in a pupil division mode and (ii) directing multiple light beams toward an individual lenslets corresponding to each of the multiple light beams.

Figure 4:
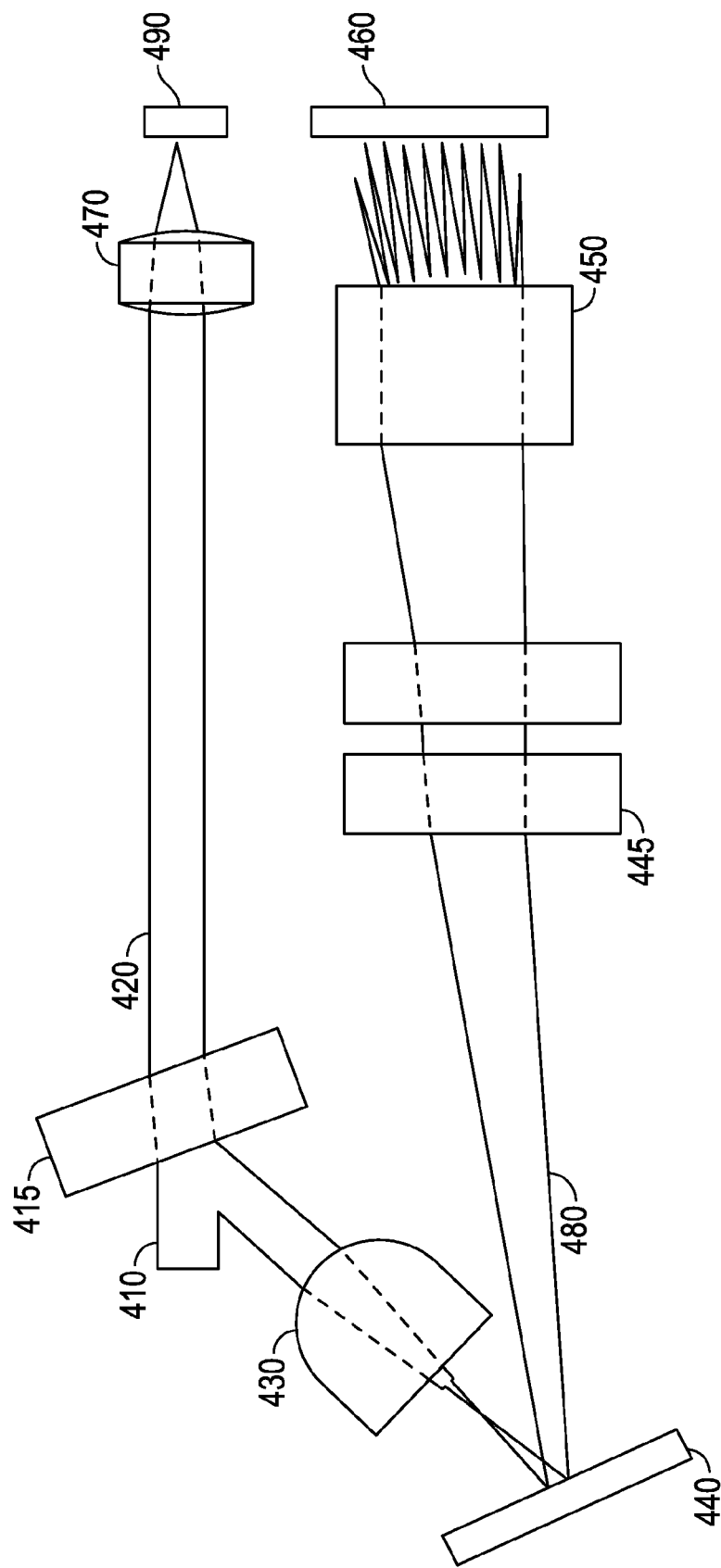
FIG. 4 shows a schematic of an optical displacement apparatus in accordance with embodiments of the present disclosure.

FIG. 4 shows a schematic of one embodiment according to the present disclosure. The coherent light beam 410, which may be collimated and/or polarized, may be split by a beam splitter 415 to generate a reference signal 420. A cylindrical condenser lens 430 spreads the beam 410 into divergent beams 480 in the far field. The input tilt mirror 440 sets the mean angle of incidence through the etalon 445. In some embodiments, the mean angle may range from about 0 degrees to about $\theta_{max}$ degrees, where:

$$\theta_{max} < \frac{w}{2d_{max}k_0}; \quad (3)$$

w=width of beam;
$k_0 = 100R(2+R)(1-R^2)^{-1}$; and
R=Reflectivity of etalon surfaces It may be understood by one of skill in the art with the benefit of the present disclosure that the mean angle may range from about 0 degrees to an angle of such magnitude as causes the light beam to degrade such that the light beam may no longer interfere with itself. The light beams 480, each with its own angle of incidence, may be partially transmitted through the etalon 445 and may be collimated before reaching a detector array 460 by a collimator lens 450. The number of angles of the light beams may vary with the finesse of the etalon 445. Finesse is a parameter characterizing an optical cavity and may be a function of the reflectivity of the mirrored surfaces of the etalon 445, herein defined by eqn. (2). Generally, a higher reflectivity may result in a higher degree of finesse and the higher the number of angles of the light beams that may be required in the etalon 445. The detector array 460 may include two or more light sensitive detectors, such as photodiodes. In this exemplary embodiment, the detector array 460 includes nine (9) detectors with a spot size of each detector at about 10 micrometers and an array spacing of about 575 micrometers. Detector array 460 may distribute the detectors linearly. Detector array 460 may include at least one detector for each of the light beams 480. The detector array 460 may be configured to generate electrical signals in response to receiving energy from the light beams 480. The collimator lens 450 may include a lens array with a plurality of lenses. Condenser lens 470 may focus light beam 410 on a reference detector 490. The light beam 410 may be of any wavelength (infra-red, visible, ultraviolet, etc.) as long as the corresponding lenses, detectors, and etalon are configured and/or selected to properly respond to the wavelength used. In some embodiments, a second light beam (not shown) at a different wavelength from light beam 410 may be used along with light beam 410.

The optical displacement device may include one or more light sources having their wavelength controlled using an optical control component. For example, the device may employ a closed loop light source control to lock the light source to the length of a high finesse temperature controlled etalon, thus supplying the sensor with light at a constant wavelength.

Figure 5:
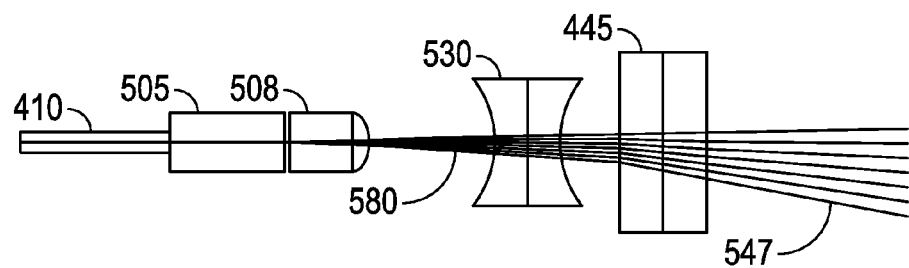
FIG. 5 shows a schematic of the divergent light beams produced in another optical displacement apparatus in accordance with embodiments of the present disclosure.
Figure 6:
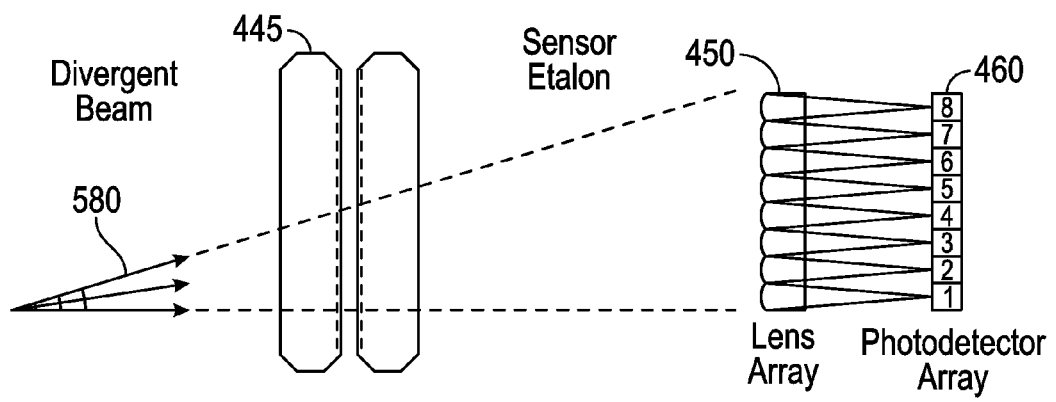
FIG. 6 shows a schematic of the interferometer and detection array of an optical displacement apparatus in accordance with embodiments of the present disclosure.

FIGS. 5 & 6 show a schematic of another embodiment according to the present disclosure. Here, coherent light beam 410 passes though a collimator lens 505 and polarizer 508 to a lens 530 that may change the incoming beam 410 into beams 580. Lens 530 may be configured to cause incoming beam 410 to diverge or converge. The beams 580 enter an etalon 445, where part of each of the beams 547 is transmitted to a lens array 450. Lens 530 is shown as a pair of concave cylindrical lenses, however, this is exemplary and illustrative only, as lens 530 may also be a single concave lens, a single convex lens, or a pair of convex lenses. Beams 580 may be divergent or convergent. The lens array 450 focuses the beams on a detector array 460. In some embodiments, a single lens (not shown) may be used in addition to or instead of the lens array 450. In some embodiments, an optical grating (not shown) may be used in addition to or instead of lens 530. The detector array 460 may be configured to generate electrical signals in response to receiving energy from the light beams 580. While there is no reference beam shown, a reference beam may be added to increase sensitivity for some applications. The reference beam may be used to cancel noise caused by intensity variations of the incoming light beam 410. The use of an optional reference beam may be determined by expertise of those of skill in the art.

In other embodiments, a coherent light beam from a fiber optic source may naturally spread to form divergent beams that may pass through an etalon to a custom lens, including for example, off-axis Fresnel zones that may transfer the incident energy of the light beam from each ring-shaped zone and direct it to an individual detector in a detector array. The detector array may include at least two detectors (which may form a linear array) responsive to electromagnetic energy and generate electrical signals in response to receiving energy from the light beams. In some examples, the array may be a two-dimensional array, which may include a charge coupled device (CCD) such as the type used in digital cameras.

Figure 7:
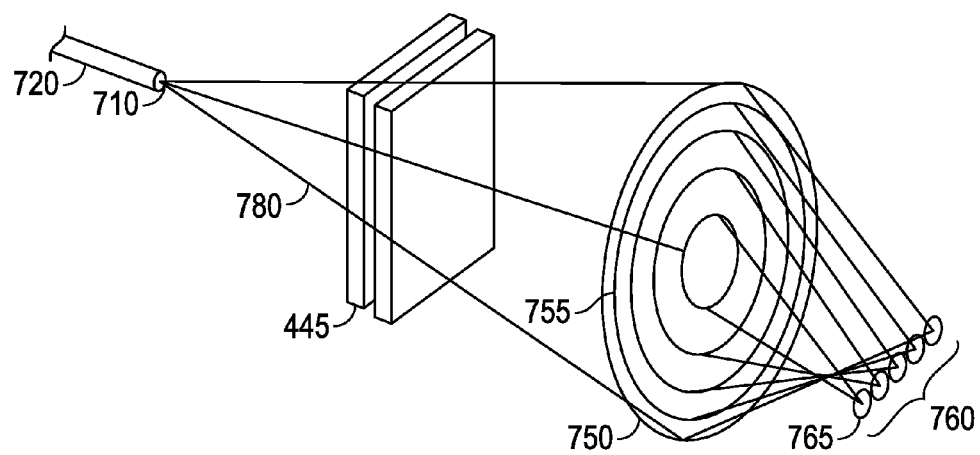
FIG. 7 shows a schematic in accordance with embodiments of the present disclosure.

FIG. 7 shows a schematic of another embodiment according to the present disclosure. Here, coherent light beam 710 from a fiber optic source 720 naturally spreads to form divergent beams 780 that may pass through an etalon 445 to a custom lens 750. The custom lens 750 may include off-axis Fresnel zones 755 that may transfer the incident energy of the light beam from each ring-shaped zone 755 and direct it to an individual detector 765 in a detector array 760. The detector array 760 may include at least two detectors responsive to electromagnetic energy. The detector array 760 may be configured to generate electrical signals in response to receiving energy from the light beams 780. The detector array 760 may include a plurality of detectors forming a linear array. An optional cylindrical lens (not shown) may be added between the fiber optic source 720 and the etalon 345 to collimate the divergent beams 780 along one axis.

Figure 8:
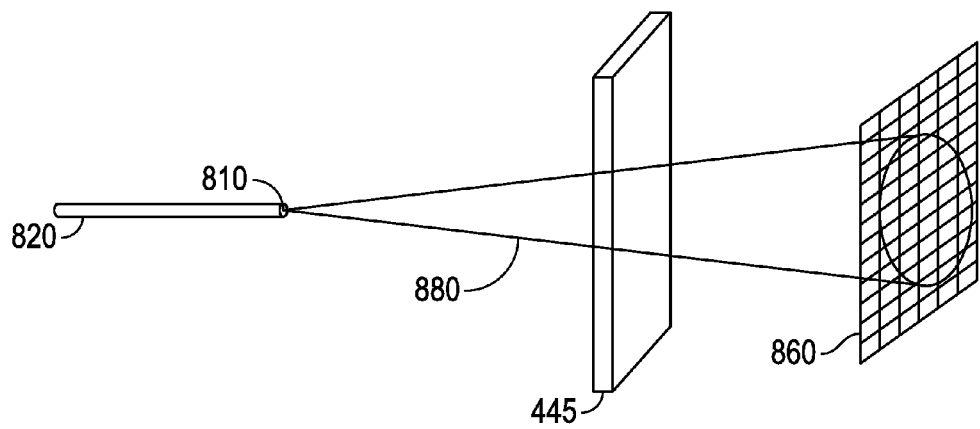
FIG. 8 shows a schematic in accordance with embodiments of the present disclosure.

FIG. 8 shows a schematic of another embodiment according to the present disclosure. In this design, the natural diffraction from an exemplary fiber-optic source 820 may cause coherent light beam 810 to form divergent beams 880 at a range of angles of approximately +/−6 degrees. This range of angles is exemplary and illustrative only, as other ranges of angles may be formed by a fiber-optic source as would be employed by one of skill in the art with the benefit of the present disclosure. After the divergent beams 880 pass through the etalon 445, the divergent beams 880 may be detected on a two-dimensional detector array 860. The detector array 860 may be configured to generate electrical signals in response to receiving energy from the light beams 880. The two-dimensional detector array 860 may include a charge coupled device (CCD) such as the type used in digital cameras. In some embodiments, an optional collimating lens (not shown) may be positioned between etalon 445 and detector array 860 to collimate the divergent light beams 880.

Noise Mitigation

A multi-beam optical gravimeter may be configured to measure acceleration, where the mean of this acceleration is due to a local gravity field. Environmental sources of noise distort the mean, leading to less accurate/precise information from the multi-beam optical gravimeter. Seismic and acoustic noise sources are a major contributor to noise. These noise sources are common mode, i.e., they affect the signal across multiple output channels of the sensor. Several techniques for extracting this common mode noise are disclosed herein. By utilizing these techniques, common mode noise is reduced by orders of magnitude, leading to a more accurate/precise response from the multi-beam optical gravimeter.

Figure 9A:
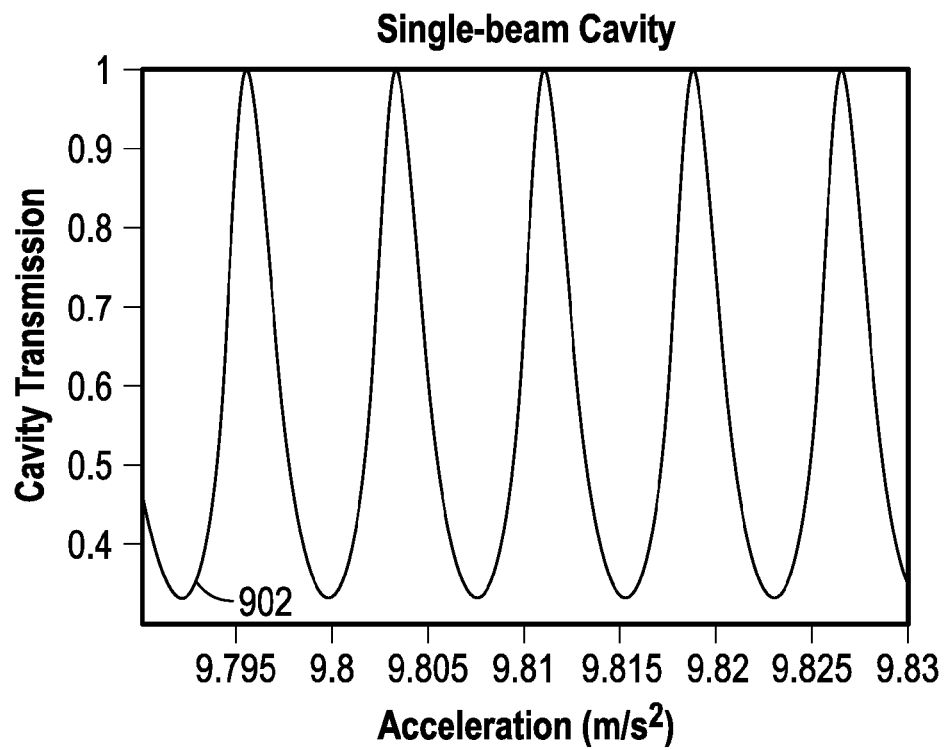
FIGS. 9A-9C illustrate example cavity responses to an acceleration in accordance with embodiments of the present disclosure.
Figure 9B:
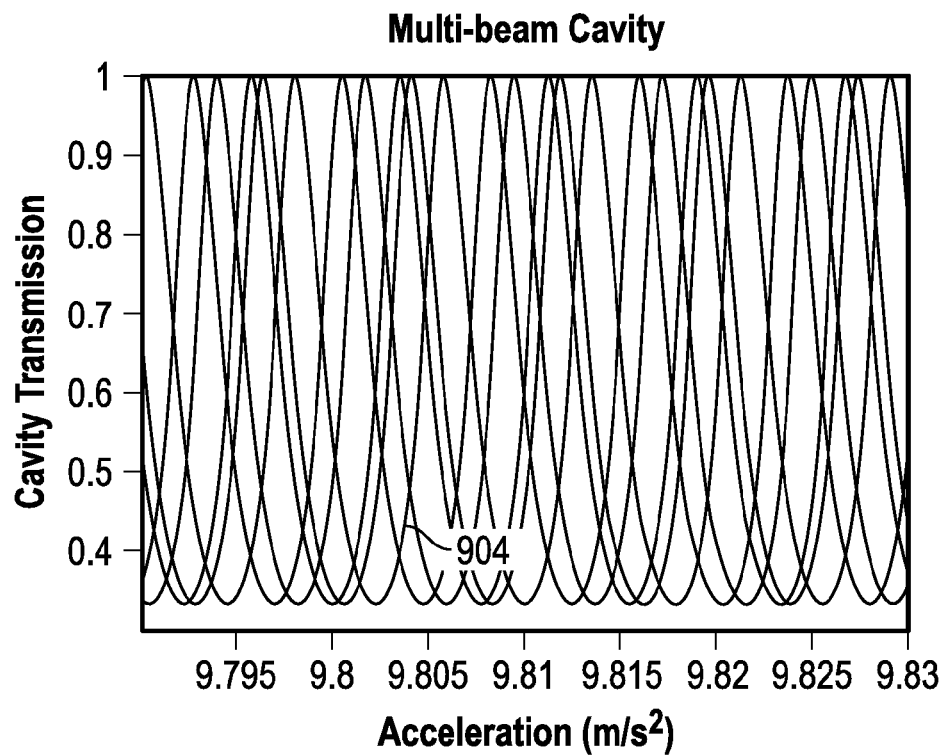

In particular embodiments, to take advantage of the optical cavity's most sensitive regions of transmission, while avoiding regions of low sensitivity, multiple wavelengths of optical beams are passed through the cavity (see FIG. 9B). Multiple wavelengths of light may be generated by passing a single wavelength through the optical cavity at a variety of angles:

$$\lambda_{\text{eff}} = \frac{\lambda_0}{n \cdot \cos\theta} \qquad (7)$$

where $\lambda_0$ is the center frequency of the source laser, $\theta$ is the angle of the beam that propagates through the cavity measured normal to the mirror face, and n is the refractive index of the cavity. The dynamic range of the optical cavity has been "filled in" by multiple fringes from each angle; that is, the multiple beams mitigate the dead-space of insensitivity from a single beam's response.

The intensity of light transmission through the etalon cavity ($T_E$) is a function of the cavity's length, l. The governing equation for this sensor is:

$$T_E = \frac{1}{1 + F \sin^2 \delta}. \quad (4)$$

where F is the finesse of the cavity (a function of the reflectivity of the reflecting surfaces), and δ is the phase response of the cavity. The cavity's phase response drives the response of the gravimeter, where:

$$\delta = \frac{2\pi \cdot l}{\lambda_{\mathit{eff}}}. \quad (5)$$

The phase response changes as the cavity length and/or wavelength of the optical beam, $\lambda_{\mathit{eff}}$, changes.

Allowing for spring motion about one of the mirrors in the cavity changes the optical transmission through the cavity from a measurement of cavity length to a measurement of acceleration, a, shown in Eq. 6.

$$ma = k(l-l_0) \Rightarrow (l-l_0) = a/\omega_0^2 \quad (6)$$

where $\omega_0$ is the resonant frequency of the mirror-spring assembly, dependent upon the 1-D spring stiffness k, $l_0$ is the length of the cavity under no acceleration, and the mirror-spring mass m.

Figure 9C:
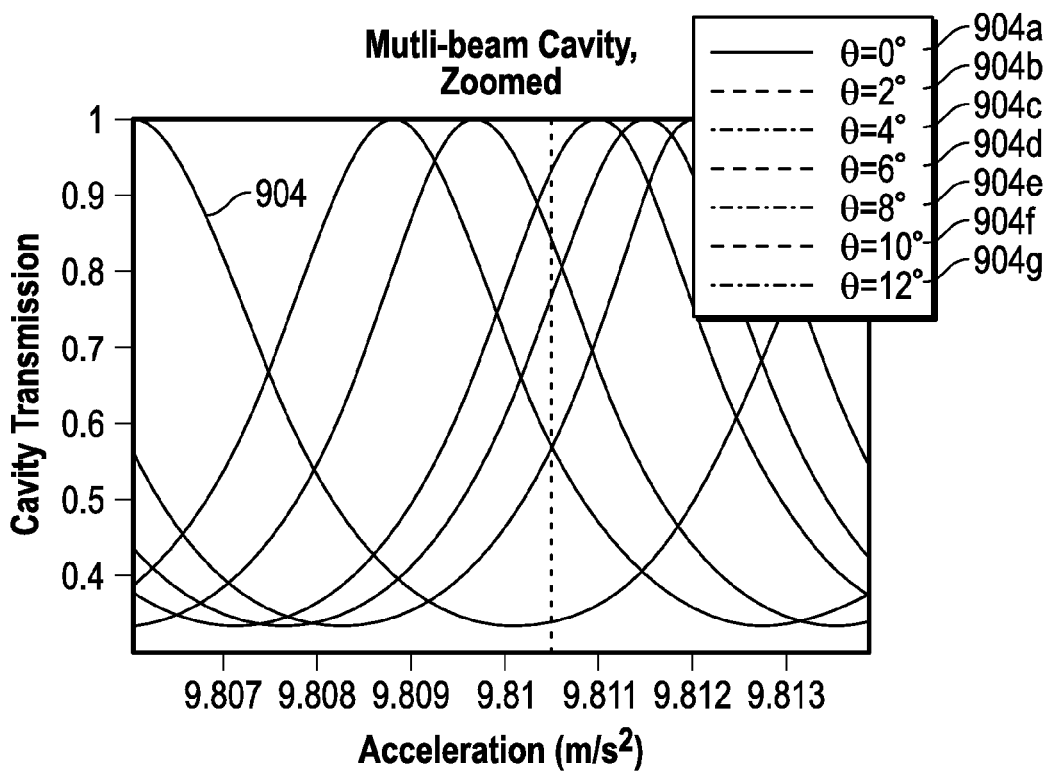

FIGS. 9A-9C illustrate example cavity responses to an acceleration of 1 g±0.2 percent. FIG. 9A shows the response 902 of a single beam given a finesse of 10, a source wavelength of 1550 nm, and a resonant frequency of 100 Hz. FIG. 9B shows the responses 904 for transmission of multiple optical beams through the same cavity to create continuous dynamic range, where the beams differ in propagation angle by 2 degrees. FIG. 9C shows the responses 904 of FIG. 9B at a smaller scale. In a single beam cavity, a series of fringes exist, separated in acceleration by $$\frac{\lambda_{\mathit{eff}}}{2\omega_0^2}.$$

These fringes have sensitive regions, i.e. regions of high |ΔT/Δa|. The single beam cavity also elicits regions of low sensitivity, where the transmission response is close to a minimum or maximum, and |ΔT/Δa| is low.

FIGS. 9B and 9C show the response of the optical cavity to multiple angles of a laser source. 9C shows the cavity response over one period of an optical beam at θ=8°, where there is at least one sensitive transmission channel, i.e. high |ΔT/Δa|, typically near 66% of maximum transmission. The dashed line of FIG. 9C shows differences in means/slopes for a set of beam angles at a=9.8105 m/s2.

Because multiple wavelengths of optical beams are passed through the cavity, the response of the sensor (e.g., detector array 860) to acceleration is composed of several optical transmission channels, corresponding to the multi-angle optical beams propagating through the cavity. These channels will each have an average value, $\mu_i$, and some "noise" represented by the standard deviation, $\sigma_i$. Two primary factors of the noise include i) seismic stimuli from the environmental that causes the mirror-spring assembly to oscillate and ii) acoustic stimuli from the environment that causes the mirror-spring assembly to oscillate. In an ideal environment, with no noise sources present, the optimal response from the sensor would be given by the most sensitive channel, providing the most accurate measurement of relative acceleration. However, a borehole is not an ideal environment.

Figure 10:
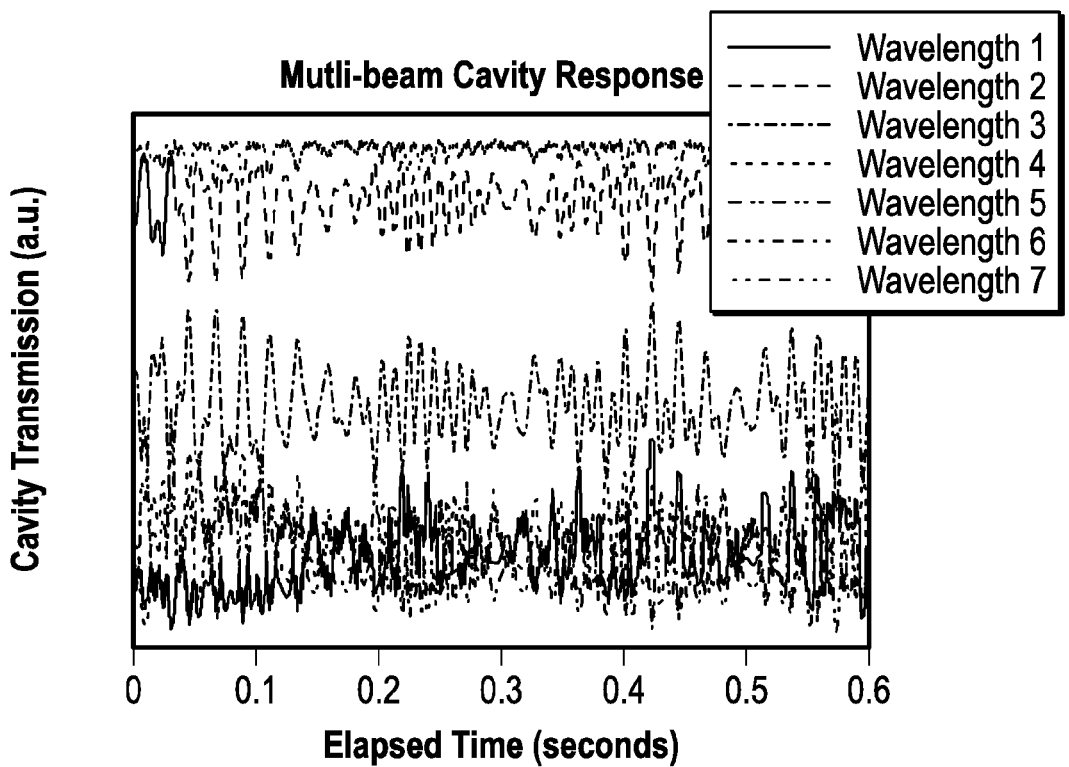
FIG. 10 shows a multi-beam cavity transmission response to environmental noise in accordance with embodiments of the present disclosure.

FIG. 10 shows a multi-beam cavity transmission response to environmental noise in accordance with embodiments of the present disclosure. FIG. 10 may be considered to illustrate an example of a noisy response from a sensor as disclosed herein. Wavelengths differ through the angle of propagation through the cavity, corresponding to individual sense channels. The most sensitive channel for this absolute acceleration is channel 6, given by the largest peak-to-peak mechanical noise response. Increased electrical noise exists on the transmission response of channels 1 and 2. Mechanical noise, due to seismic and acoustic stimulation from the environment, is present across all channels. Oppositely responding channels, i.e. channel 6 and 7, are on opposite sides of their respective transmission fringes, and as such have opposite slopes.

To accurately evaluate relative acceleration, an accurate measure of $\mu_i$ is needed. Sources of noise distort these average values, where stimulus events from the environment cause the transmission response of optical channels to oscillate. This noise needs to be reduced in order to accurately evaluate $\mu_i$.

Electrical and mechanical noise is seen in the cavity transmission response from the multi-beam sensor. The transmission response from wavelengths 1 and 2, i.e. channels 1 and 2, show increased electrical noise not common across the other optical channels. This is due to electronic noise in the receiver/preamplifier electronics for these particular channels. Common mode seismic and acoustic noise exists across all channels, though some response more so than others. This is due to the optical channel's average location on its particular transmission fringe. Optical channel 6 is the most sensitive, as it elicits the highest peak-to-peak response to seismic and acoustic stimuli. Some curves respond in opposite directions, such as channel 6 compared to channel 7. This is due to the average location of these channels being on opposite sides of their respective fringes, where ΔT/Δa for channel 6 is positive and ΔT/Δa for channel 7 is negative.

This common mode mechanical noise is the result of the mirror-spring assembly oscillating in the cavity. This length difference is detected by all channels simultaneously, though some are more sensitive than others. Though this mirror oscillation is a length change detected by the optical cavity, it is regarded as noise that must be attenuated/eliminated for the purpose of gravimeter measurements. The method(s) described hereafter reduce this common mode noise.

The simplest implementation of a differential measurement of the optical cavity is through differential correlation analysis. In this method, the most sensitive channel is compared with a channel that shares the highest correlation. This correlated channel is detecting mirror-spring oscillations with the most similar sensitivity. By comparing the mean removed data of these two channels, and performing a point-by-point subtraction, the remaining signal represents a first order differential measurement of the optical transmission of the most sensitive channel. An example procedure follows:

I. Find the most sensitive channel
  II. Check for which channel has the highest correlation coefficient
  III. Remove the most correlated channel's mean from its response, leaving only a "cyclical" portion (if correlation coefficient is negative, invert the cyclical response)

IV. Normalize the cyclical response of the correlated channel to the cyclical response of the sensitive channel, such that the linear components are of the same magnitude V. Perform a point-by-point subtraction of the cyclical response of the most correlated channel from the sensitive channel The result of this procedure is the response of the most sensitive optical channel with the common mode noise from mechanical stimuli attenuated, which represents a first order differential measurement of the optical transmission of the most sensitive channel.

Figure 11A:
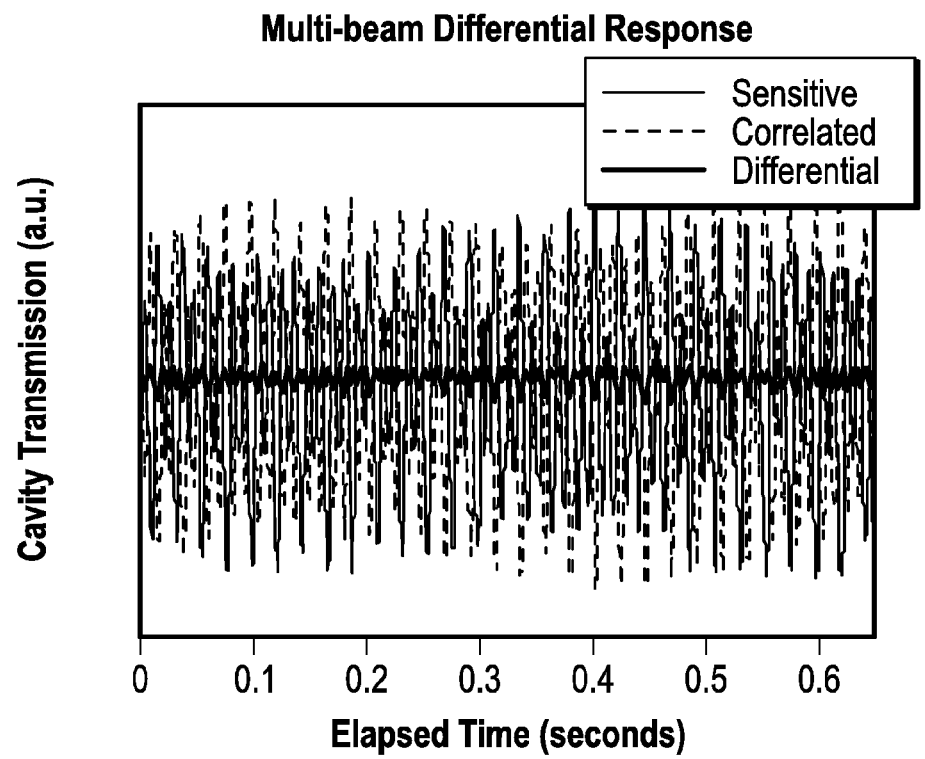
FIGS. 11A-11C illustrates a differential response of the multi-beam cavity in accordance with embodiments of the present disclosure.
Figure 11B:
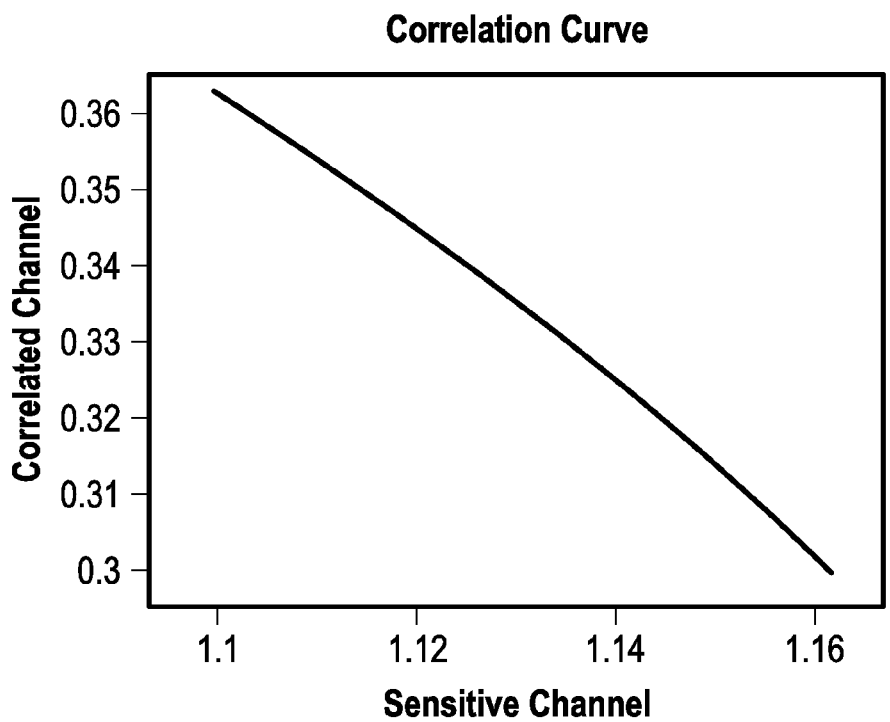
Figure 11C:
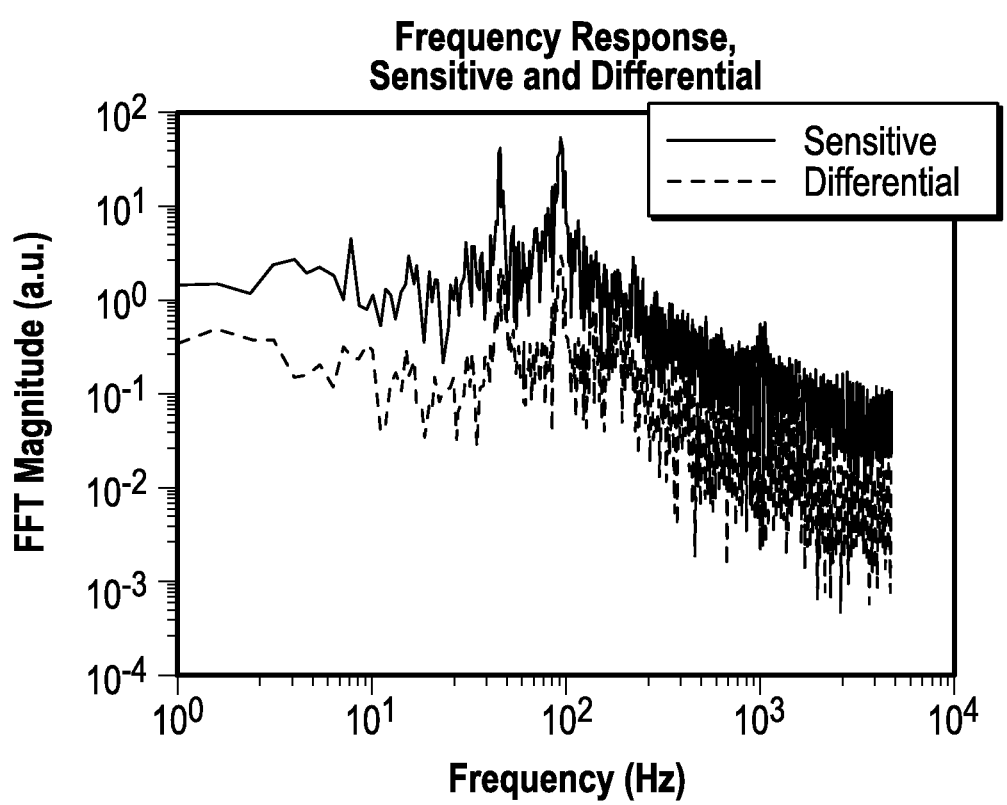

FIGS. 11A-11C illustrates a differential response of the multi-beam cavity in accordance with embodiments of the present disclosure. FIG. 11A shows a noisy response of a sensitive channel, similar response of the most correlated channel, and a corresponding differential measurement. FIG. 11B shows a representation of the sensitive channel versus the most correlated channel using reference normalized outputs of the sensor.

As is apparent, the differential measurement shows much less noise than the most sensitive channel. The two channels are negatively correlated, with a correlation coefficient of −0.99858. For this particular data set, the differential measurement through correlation analysis reduced the overall noise of the sensitive channel by approximately 22 dB. Plotting the response of the sensitive channel versus the most correlated channel (FIG. 11B), there is a nonlinear response between the two channels. This nonlinearity limits the noise reduction from the differential correlation.

FIG. 11C shows a Fast-Fourier-Transform ('FFT') response of sensitive and differential channels, where the mechanical resonance of the mirror-spring cavity is near 100 Hz. The FFT of the sensitive channel compared to the differential measurement shows the attenuation of AC response in the differential channel. In particular, the source of mechanical noise, i.e. the resonant response of the spring near 100 Hz, is reduced by 25 dB. Higher frequency terms, at 1 kHz and above, are attenuated less. This frequency domain is most likely differential electronic noise, unique to each channel.

Differential correlation analysis as described above is readily implemented in a real-time system, operating on small arrays of information at a time. The response from seismic and acoustic noise in the environment is reduced, with this dataset showing attenuation by more than an order of magnitude. This noise reduction technique may be dependent upon the correlation coefficient between the sensitive and most correlated channel, where higher correlation leads to higher noise reduction.

Figure 12A:
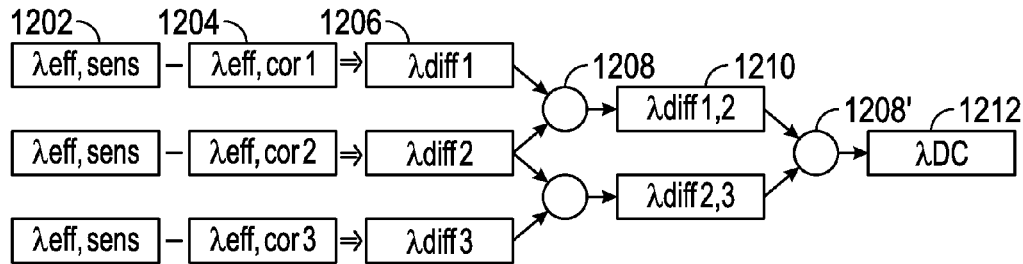
FIGS. 12A & 12B illustrate a differential response of the multi-beam cavity in accordance with embodiments of the present disclosure.
Figure 12B:
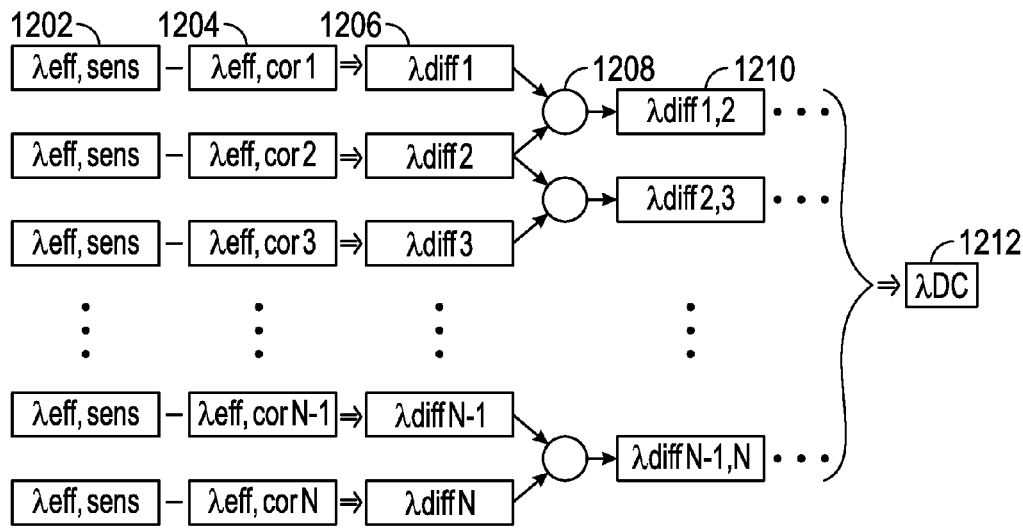

FIGS. 12A & 12B illustrate a differential response of the multi-beam cavity in accordance with embodiments of the present disclosure. In one approach, a branching structure is developed, where secondary channels are compared and their common-mode response is attenuated. This technique may be referred to as extended differential correlation analysis. The resulting response provides for even higher attenuation of seismic and acoustic sources of noise.

Referring to FIG. 12A, differential correlation analysis can be "extended" to include correlation effects from multiple channels, with the addition of more correlated channels to process. Uniqueness of the channels may distort the output of differential correlation analysis. This distortion may be mitigated by using multiple channels. Initially, the most sensitive channel $\lambda_{\it{eff,sens}}$ 1202 is selected and processed against all other channels to find the three most correlated channels 1204: $\lambda_{\it{eff,corr1}}$, $\lambda_{\it{eff,corr2}}$, and $\lambda_{\it{eff,corr3}}$.

Differential correlation analysis occurs between the sensitive channel 1202 and these three correlated channels 1204, resulting in three common mode suppressed outputs 1206: $\lambda_{\it{diff1}}$, $\lambda_{\it{diff2}}$, and $\lambda_{\it{diff3}}$.

The common mode suppression between the sensitive channel and the most correlated channel will be highest, but nonlinearities and peak-to-peak differences may distort the differential output. The other two channels will not suppress common mode noise as effectively, given their decreased correlation with the most sensitive channel, but their differential response will respond differently to nonlinearities and peak-to-peak differences given the uniqueness of each channel in the optical cavity. It is the combination 1208, 1208' of these differential measurements, $\lambda_{\it{diff1}}$, $\lambda_{\it{diff2}}$, and $\lambda_{\it{diff3}}$, that leads to a more accurate common-mode suppression, $\lambda_{DC}$ 1212. The result of this analysis is increased attenuation of correlated signals, leading to a mechanical-noise suppressed response from the sensitive channel, $\lambda_{DC}$. The intermediate results 1210 ($\lambda_{\it{diff2,2}}$ and $\lambda_{\it{diff2,2}}$) are obtained by combining (1208) previously processed channels 1206. Noise suppressed response $\lambda_{DC}$ is obtained by combining (1208') intermediate results 1210. Combination is implemented here by mean subtraction, as described above. Analysis can be extended to N channels (FIG. 12B), limited only by the processing time available and the number of channels passing through the optical cavity.

Figure 13:
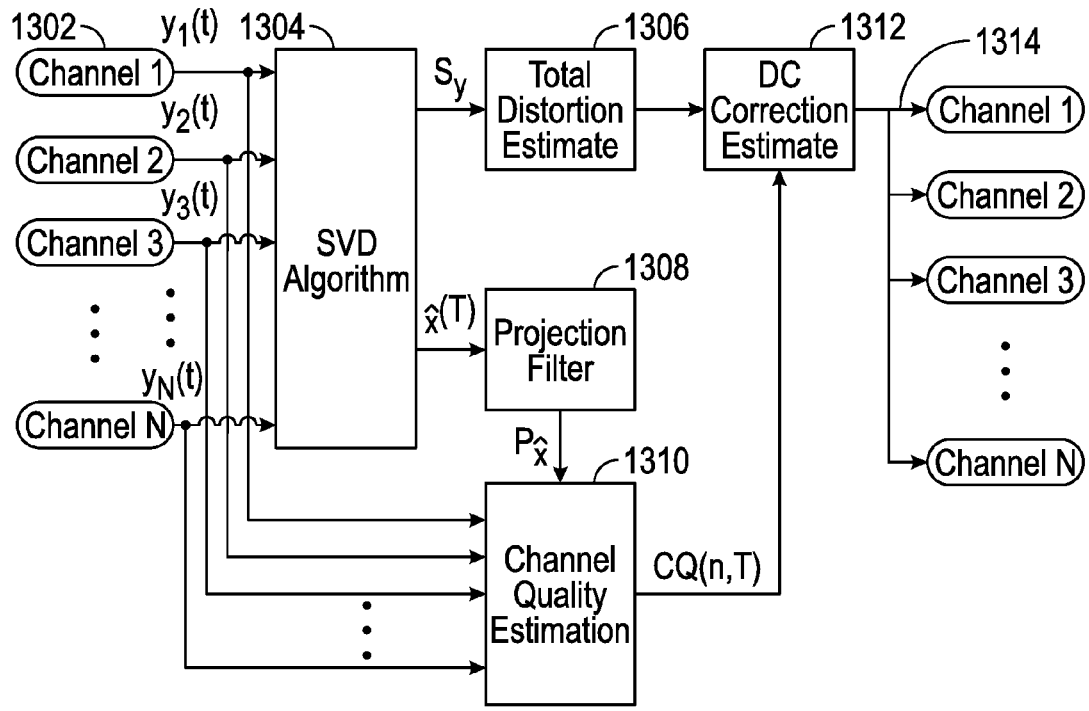
FIG. 13 is a data flow diagram illustrating identification of common mode output via Singular Value Decomposition ('SVD') in accordance with embodiments of the present disclosure.

FIG. 13 is a data flow diagram illustrating identification of common mode output via Singular Value Decomposition ('SVD') in accordance with embodiments of the present disclosure. Applying an SVD algorithm 1304 to the multi-beam optical cavity data, the gravitational acceleration x(T), is estimated over a time period of length T seconds.

Consider a matrix, Y(T) which is constructed from the channel data over a period of time T. In this construction, each row of the matrix is formed from the data of a single channel 1302 (e.g., $y_1(t)$), which is assumed to be real. The SVD of Y(T) represents the orthogonal decomposition of the channel data in N-space, such that:

$$Y(T) = \begin{bmatrix} y_1(T) \\ y_2(T) \\ \vdots \\ y_N(T) \end{bmatrix}_{NM} = [U_y S_y V_y^*] \quad (8)$$

where

Uy is an N×N orthogonal matrix,

Sy is an N×M diagonal matrix, with non-negative real diagonal elements, and

Vy* is the transpose of the M×M orthogonal matrix Vy.

The diagonal elements $\sigma_n$ of Sy are the singular values of Y(T). By ordering the singular values in descending order a unique representation of the matrix Sy is determined. If the channel data is highly correlated, then the mode of the largest singular value $\sigma_1$ is assumed to be composed of the gravitational acceleration x(T), plus a distortion component $d_1(T)$. The remaining modes of the SVD are assumed to be the result of channel distortion and uncorrelated noise. If one considers that each channel has a coherent component and a distortion plus non-coherent noise component, the SVD will identify the strongest mode of the signal subspace as the coherent component, which is generated by motion on the sensor. If this assumption is not valid, then more noise and distortion exists in the signal subspace than signal.

$$Y(T) = \begin{pmatrix} u_1 \\ u_2 \\ \vdots \\ u_N \end{pmatrix} \begin{pmatrix} \sigma_x + \sigma_{d_1} & 0 & \cdots & 0 \\ 0 & \sigma_{d_2} & \cdots & 0 \\ \vdots & \vdots & \ddots & \vdots \\ 0 & 0 & \cdots & \sigma_{d_N} \end{pmatrix} \begin{pmatrix} x(T) + d_1(T) \\ d_2(T) \\ \vdots \\ d_N(T) \end{pmatrix} \quad (9)$$

Let the estimate of the gravitational acceleration be, $$\hat{x}(T) = V^*(1) \quad (10)$$
$$= x(T) + d_1(T)$$

We now introduce the concept of a Total Distortion (TD) estimate 1306. It is assumed that the singular values $\sigma_{d_2} \ldots \sigma_{d_{(N-1)}}$ are comprised of the uncorrelated channel distortion plus an uncorrelated noise component $\sigma_n$. It is further assumed that the uncorrelated noise component is uniformly distributed across the range of the modes of Y(T) from n=2 . . . N, but is most accurately estimated by the singular value of lowest amplitude $\sigma d_N$.

Applying these assumptions leads to a TD(T) estimate of, $$TD(T) = A\Sigma_{n=2}^{N-1} \sigma_{d_n} - (N-1)\sigma_{d_N} \quad (11)$$

where the constant gain factor A is used to include the distortion term in the first singular mode $\sigma d_1$. A may be set to 2 initially and further refined for optimal performance. Estimated distortion is then distributed across the channels with a projection filter 1308. The orthogonal projection matrix $P_{\hat{x}}$ is defined onto the range of $\hat{x}$.

$$P_{\hat{x}} = \hat{x}(\hat{x}^*\hat{x})^{-1}\hat{x}^* \quad (12)$$

$P_{\hat{x}}$ is a linear operator which is used to measure the amount of power from each channel that falls within the range of the gravitational estimate $\hat{x}$. Channel Quality estimation 1310 considers the measure of Channel Quality (CQn,T), for the n-th channel over the time period T.

$$CQ(n, T) = \frac{\sqrt{y_n^*(T)P_{\hat{x}}y_n(T)}}{\Sigma_{n=1}^{N}\sqrt{y_n^*(T)P_{\hat{x}}y_n(T)}} \quad (13)$$

CQ(n,T) takes the signal from the n-th channel and projects it onto the range of $\hat{x}$. This quantity is then divided by the sum of the projections from each channel. CQ(n,T) is a normalized measure of the amount of contained in each channel over the time period T. Using CQ and TD to construct an estimate of the DC error (DC correction estimate 1312) in each channel over the time period T, $$\delta y_n(T) = \pm CQ(n,T) \cdot TD(T) \quad (14)$$

The polarity of the correction can be determined by considering the initial DC value of each channel. This correction is non-intuitive, as the channels with the highest CQ have the highest amplitude and are more likely to be distorted. The estimate of the DC level of the n-th channel is defined as:

$$\hat{y}_n(T)_{DC} = y_n(T)_{DC} + \delta y_n(T). \quad (15)$$

By applying this methodology to sample data from the multi-channel sensor, and removing common response functions, an estimate for the DC response of each channel 1314 is produced. Comparing the variance in this estimated response with the variance in the raw data, a noise reduction of 40 dB or more may be achieved.

Figure 14:
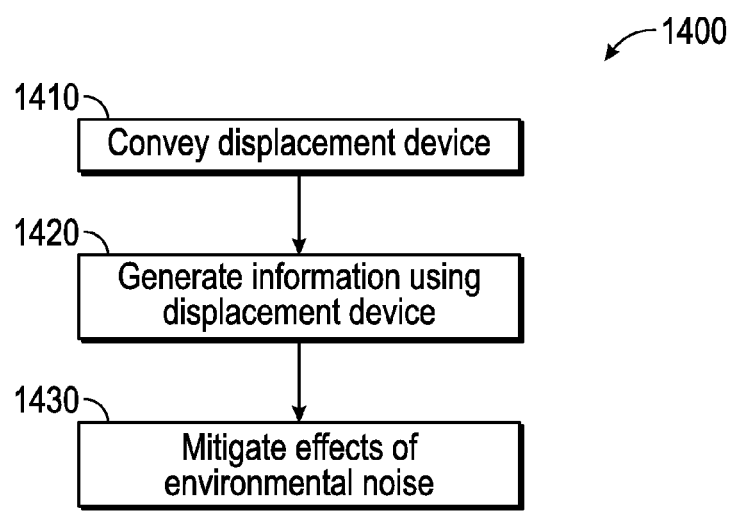
FIG. 14 shows of flow chart of a method for estimating a parameter of interest in an earth formation intersected by a borehole in accordance with embodiments of the present disclosure.

FIG. 14 shows of flow chart of a method 1400 for estimating a parameter of interest in an earth formation intersected by a borehole according to one embodiment of the present disclosure. The method 1400 may include using device 100 or the like. In step 1410, an optical displacement device is conveyed into the borehole 12. For example, the optical displacement device may be conveyed using conveyance device (or carrier) 14. The optical displacement device may be incorporated as an instrument in a downhole logging tool.

In step 1420, the optical displacement device is used to generate information from the optical displacement device relating to displacement, e.g., relative motion between two or more reflective surfaces of the optical displacement device that is indicative of the parameter of interest. For example, a plurality of light beams 880 may be transmitted into an etalon 445 and partially transmitted from the etalon 445 to a detector array 860. The etalon is configured to receive a first electromagnetic beam with a first value of a beam property and a second electromagnetic beam with a second value of the beam property, wherein the first value is different than the second value. An external stimulus related to the parameter of interest (such as force or acceleration) causes a displacement in one of the mirrored surfaces of the etalon 445, which changes the cavity length of the etalon 445. Electrical signals generated by the detector array 860 due to the partially transmitted light beams may be altered as a result of change in cavity length of the etalon 445. The signals may carry (embody) the information. An external stimulus may be estimated based on the change in the electrical signals generated by the detector array 860. In some embodiments, the external stimulus estimation may also use a reference signal generated by a reference detector.

In step 1430, the method includes mitigating effects of the environmental noise on the information by determining correlated portions of each corresponding signal representative of effects of common mode elements of the environmental noise on each corresponding signal. Mitigating may be carried out by using the correlated portions of each corresponding signal to estimate a corresponding noise signal for the second signal, the corresponding noise signal representing a portion of the second signal attributable to the environmental noise; and modifying the first signal using the corresponding noise signal for the second signal to attenuate the effects of the environmental noise on the first signal. For example, modifying the first signal may include subtracting the noise signal of the second signal from the first signal.

The method may also include selecting the first signal from a plurality of signals (from the multiple electromagnetic beam, as described herein), the selection comprising identifying the first signal as the most sensitive of the plurality of signals to displacement. The method may also include selecting the second signal from a plurality of signals (from the multiple electromagnetic beam, as described herein), the selection comprising identifying the second signal as the most correlated of the plurality of signals to the first signal. Alternatively, a number of signals may be selected (e.g., 3) as the most correlated to the first signal. A noise signal may be determined for each selected signal and used to determine a corresponding common mode suppressed signal for each of the selected signals by modifying the respective signal using the corresponding noise signal. The method may include combining the corresponding common mode suppressed signals to produce the noise-mitigated signal. Alternatively, the method may include using singular value decomposition to estimate a common mode output across the multiple signals.

Displacement as used herein means change in position over time. Displacement may include relative displacement (e.g., displacement of a member relative to a sensor, another member, or the rest of the device) or absolute displacement (e.g., displacement relative to the earth). Common mode noise refers to noise synchronously stimulating sensor response across multiple channels.

The term "carrier" as used herein means any device, device component, combination of devices, media and/or member that may be used to convey, house, support, or otherwise facilitate the use of another device, device component, combination of devices, media and/or member. Exemplary non-limiting carriers include drill strings of the coiled tube type, of the jointed pipe type, and any combination or portion thereof. Exemplary non-limiting conveyance devices include drillstrings of the coiled tube type, of the jointed pipe type and any combination or portion thereof. Other conveyance device examples include casing pipes, wirelines, wire line sondes, slickline sondes, drop shots, downhole subs, BHA's, drillstring inserts, modules, internal housings and substrate portions thereof, and self-propelled tractors.

The term "information" as used above includes any form of information (analog, digital, EM, printed, etc.). Herein, the term "information" may include one or more of: raw data, processed data, and signals. The term "processor" herein includes, but is not limited to, any device that transmits, receives, manipulates, converts, calculates, modulates, transposes, carries, stores or otherwise utilizes information. In embodiments, the processor may be configured to include resident memory (and/or peripherals) operatively coupled to the processor, so as to be accessible to the processor for executing programmed instructions. In several non-limiting aspects of the disclosure, a processor may be embodied as a computer that executes programmed instructions for performing various methods. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on.

Herein, "environmental noise" refers to mechanical causes of displacement unrelated to the parameter of interest to be measured, and may be distinguished from electronic noise. For example, seismic noise and acoustic noise are two possible types of environmental noise. In a gravimeter, environmental noise distorts the mean of acceleration due to a local gravity field.

Certain embodiments of the present disclosure may be implemented with a hardware environment that includes a processor, an information storage medium, an input device, processor memory, and may include peripheral information storage medium. The hardware environment may be in the well, at the rig, or at a remote location. Moreover, the several components of the hardware environment may be distributed among those locations. The input device may be any data reader or user input device, such as data card reader, keyboard, USB port, etc. The information storage medium stores information provided by the detectors. Information storage medium may include any non-transitory computer-readable medium for standard computer information storage, such as a USB drive, memory stick, hard disk, removable RAM, EPROMs, EAROMs, flash memories and optical disks or other commonly used memory storage system known to one of ordinary skill in the art including Internet based storage. Information storage medium stores a program that when executed causes information processor to execute the disclosed method. Information storage medium may also store the formation information provided by the user, or the formation information may be stored in a peripheral information storage medium, which may be any standard computer information storage device, such as a USB drive, memory stick, hard disk, removable RAM, or other commonly used memory storage system known to one of ordinary skill in the art including Internet based storage. Information processor may be any form of computer or mathematical processing hardware, including Internet based hardware. When the program is loaded from information storage medium into processor memory (e.g. computer RAM), the program, when executed, causes information processor to retrieve detector information from either information storage medium or peripheral information storage medium and process the information to estimate a parameter of interest. Information processor may be located on the surface or downhole.

While the disclosure has been described with reference to exemplary embodiments, it will be understood that various changes may be made and equivalents may be substituted for elements thereof without departing from the scope of the disclosure. In addition, many modifications will be appreciated to adapt a particular instrument, situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

While the foregoing disclosure is directed to the one mode embodiments of the disclosure, various modifications will be apparent to those skilled in the art. It is intended that all variations within the scope of the appended claims be embraced by the foregoing disclosure.

We claim:

1. An apparatus for estimating a parameter of interest, comprising:
   a displacement sensor comprising:
      a displacement device configured for displacement responsive to the parameter of interest and spring oscillation of the displacement device due to environmental noise;
      a detector array configured to provide information comprising a first signal and a second signal both relating to the displacement, wherein the first signal is at least as sensitive to the displacement as the second signal; and
   at least one processor configured to mitigate effects of the environmental noise on the information by determining correlated portions of each corresponding signal representative of effects of common mode elements of the environmental noise on each corresponding signal, and estimate the parameter of interest from the information;
   wherein the displacement device is an optical displacement device configured to receive a first electromagnetic beam with a first value of a beam property and a second electromagnetic beam with a second value of the beam property, wherein the first value is different than the second value, the optical displacement device comprising a displacement element configured for displacement responsive to the parameter of interest and the environmental noise; and
   wherein the information comprises a first signal relating to the displacement responsive to a received part of the first electromagnetic beam and a second signal relating to the displacement responsive to a received part of the second electromagnetic beam, wherein the received part of the first electromagnetic beam and the received part of the second electromagnetic beam both pass through at least part of the optical displacement device.

2. The apparatus of claim 1 wherein the at least one processor is configured to:
use the correlated portions of each corresponding signal to estimate a corresponding noise signal for the second signal, the corresponding noise signal representing a portion of the second signal attributable to the environmental noise; and
modify the first signal using the corresponding noise signal for the second signal to attenuate the effects of the environmental noise on the first signal.

3. The apparatus of claim 2 wherein the at least one processor is configured to subtract the noise signal of the second signal from the first signal.

4. The apparatus of claim 2 wherein the at least one processor is configured to select the first signal from a plurality of signals each responsive to a received part of a corresponding electromagnetic beam having passed through at least part of the optical displacement device, the selection comprising identifying the first signal as the most sensitive of the plurality of signals to displacement.

5. The apparatus of claim 2 wherein the at least one processor is configured to select the second signal from a plurality of signals each responsive to a received part of a corresponding electromagnetic beam having passed through at least part of the optical displacement device, the selection comprising identifying the second signal as the most correlated of the plurality of signals to the first signal.

6. The apparatus of claim 2 wherein the at least one processor is configured to:
remove the mean of the first signal from the first signal to derive a cyclical response;
determine the corresponding noise signal by removing the mean of the second signal from the second signal;
normalize the corresponding noise signal to the cyclical response of the first signal, such that the linear components are of the same magnitude; and
perform a point-by-point subtraction of the corresponding noise signal from the cyclical response.

7. The apparatus of claim 2 wherein each corresponding noise signal has a higher frequency than the remainder of the signal to which it corresponds.

8. The apparatus of claim 2 wherein the at least one processor is configured to:
select the second signal and at least one other signal from a plurality of signals each responsive to a received part of a corresponding electromagnetic beam having passed through at least part of the optical displacement device, the selection comprising identifying the second signal and the at least one other signal as the most correlated of the plurality of signals to the first signal;
estimate a corresponding noise signal for each of the second signal and the at least one other signal; and
determine a corresponding common mode suppressed signal for each of the second signal and the at least one other signal by modifying the first signal using the corresponding noise signal for each of the second signal and the at least one other signal; and
combine the corresponding common mode suppressed signals.

9. The apparatus of claim 1 wherein the at least one processor is configured to use singular value decomposition to estimate a common mode output across the first signal, the second signal, and at least one other signal responsive to a received part of a corresponding electromagnetic beam having passed through at least part of the optical displacement device.

10. The apparatus of claim 9 wherein a mode of the largest singular value is assumed to be composed of the gravitational acceleration and a distortion component and the remaining modes are assumed to be the result of channel distortion and uncorrelated noise.

11. A method for estimating a parameter of interest, comprising:
estimating the parameter of interest using a detector array configured to provide information comprising a first signal and a second signal both relating to displacement of a displacement device of a displacement sensor, the displacement device configured for displacement responsive to the parameter of interest and spring oscillation of the displacement device due to environmental noise, wherein the first signal is at least as sensitive to the displacement as the second signal, the estimation comprising mitigating effects of the environmental noise on the information by determining correlated portions of the first signal and the second signal representative of effects of the environmental noise on the corresponding signal;
wherein the displacement device is an optical displacement device configured to receive a first electromagnetic beam with a first value of a beam property and a second electromagnetic beam with a second value of the beam property, wherein the first value is different than the second value, the optical displacement device comprising a displacement element configured for displacement responsive to the parameter of interest and the environmental noise; and
wherein the information comprises a first signal relating to the displacement responsive to a received part of the first electromagnetic beam and a second signal relating to the displacement responsive to a received part of the second electromagnetic beam, wherein the received part of the first electromagnetic beam and the received part of the second electromagnetic beam both pass through at least part of the optical displacement device.

12. The method of claim 11 comprising:
using the correlated portions of each corresponding signal to estimate a corresponding noise signal for the second signal, the corresponding noise signal representing a portion of the second signal attributable to the environmental noise; and
modifying the first signal using the corresponding noise signal for the second signal to attenuate the effects of the environmental noise on the first signal.

13. The method of claim 12 comprising selecting the first signal from a plurality of signals each responsive to a received part of a corresponding electromagnetic beam having passed through at least part of the optical displacement device, the selection comprising identifying the first signal as the most sensitive of the plurality of signals to displacement.

14. The method of claim 12 comprising selecting the second signal from a plurality of signals each responsive to a received part of a corresponding electromagnetic beam having passed through at least part of the optical displacement device, the selection comprising identifying the second signal as the most correlated of the plurality of signals to the first signal.

15. The method of claim 12 comprising:
selecting the second signal and at least one other signal from a plurality of signals each responsive to a received part of a corresponding electromagnetic beam having passed through at least part of the optical displacement device, the selection comprising identifying the second signal and the at least one other signal as the most correlated of the plurality of signals to the first signal;
estimating a corresponding noise signal for each of the second signal and the at least one other signal; and
determining a corresponding common mode suppressed signal for each of the second signal and the at least one other signal by modifying the first signal using the corresponding noise signal for each of the second signal and the at least one other signal; and
combining the corresponding common mode suppressed signals.

16. The method of claim 11 comprising using singular value decomposition to estimate a common mode output across the first signal, the second signal, and at least one other signal responsive to a received part of a corresponding electromagnetic beam having passed through at least part of the optical displacement device.

17. An apparatus for estimating a parameter of interest, comprising:
an optical interferometer comprising:
a displacement device configured for displacement responsive to the parameter of interest and environmental noise, the displacement resulting in a change in length of an optical cavity of the interferometer;
a detector array configured to provide information comprising a first signal and a second signal both relating to the change in length, wherein the first signal is at least as sensitive to the change in length as the second signal; and
at least one processor configured to mitigate effects of the environmental noise on the information by determining correlated portions of each corresponding signal representative of effects of common mode elements of the environmental noise on each corresponding signal, and estimate the parameter of interest from the information;
wherein the displacement device is an optical displacement device configured to receive a first electromagnetic beam with a first value of a beam property and a second electromagnetic beam with a second value of the beam property, wherein the first value is different than the second value, the optical displacement device comprising a displacement element configured for displacement responsive to the parameter of interest and the environmental noise; and
wherein the information comprises a first signal relating to the displacement responsive to a received part of the first electromagnetic beam and a second signal relating to the displacement responsive to a received part of the second electromagnetic beam, wherein the received part of the first electromagnetic beam and the received part of the second electromagnetic beam both pass through at least part of the optical displacement device.

* * * * *